J. J. GSCHWENDER.
AUTOMATIC SAFETY SHUTTER FOR CINEMATOGRAPH MACHINES.
APPLICATION FILED JULY 18, 1917.
1,426,630.
Patented Aug. 22, 1922.
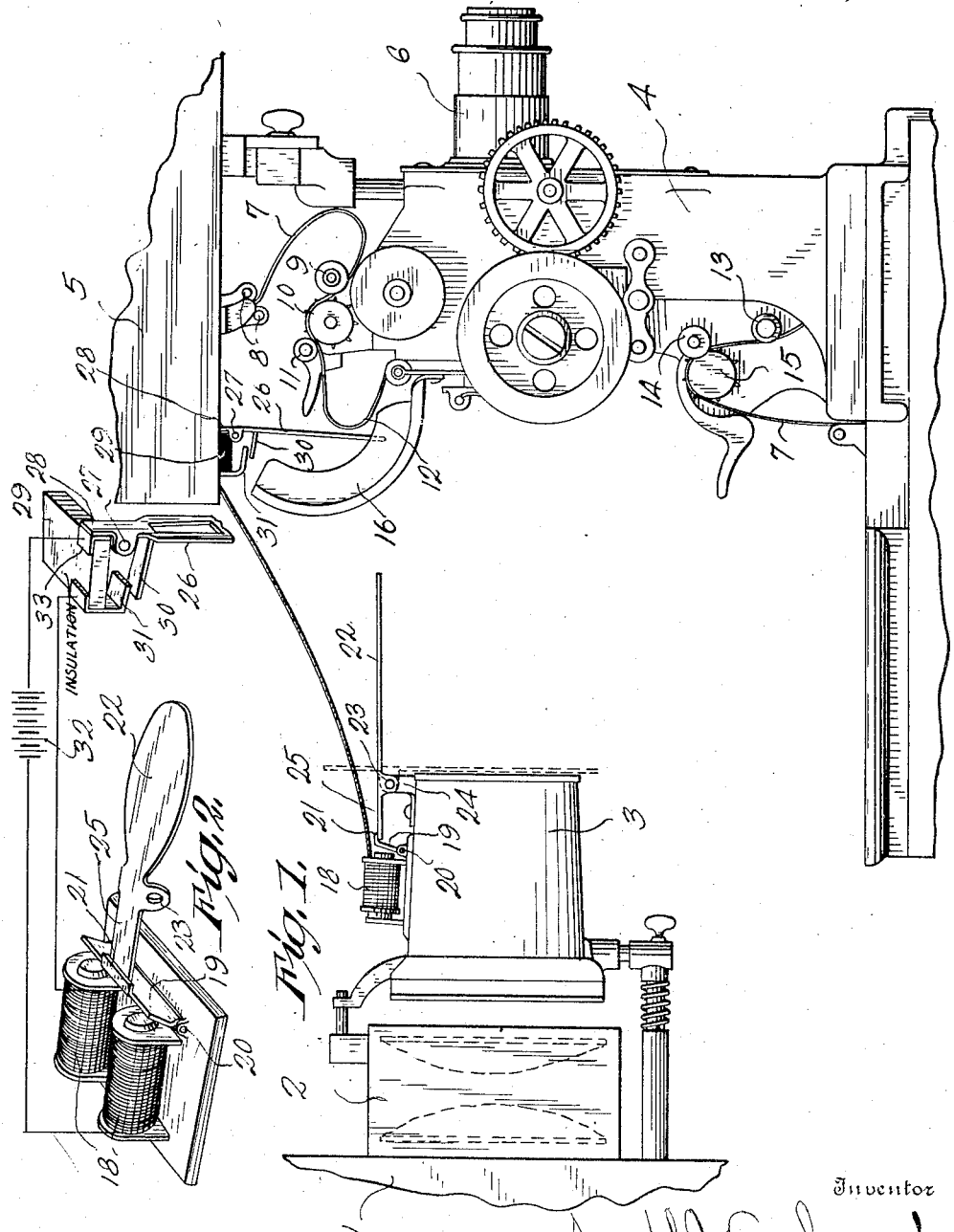
Witnesses
RW Hoagland
E. E. Duncan
Inventor
Joseph J. Gschwender
By F. L. Walker
Attorney

UNITED STATES PATENT OFFICE.

JOSEPH J. GSCHWENDER, OF DAYTON, OHIO.

AUTOMATIC SAFETY SHUTTER FOR CINEMATOGRAPH MACHINES.

1,426,630.  Specification of Letters Patent.  Patented Aug. 22, 1922.

Application filed July 18, 1917. Serial No. 181,212.

*To all whom it may concern:*

Be it known that I, JOSEPH J. GSCHWENDER, citizen of the United States, residing at Dayton, in the county of Montgomery and State of Ohio, have invented certain new and useful Improvements in Automatic Safety Shutters for Cinematograph Machines, of which the following is a specification.

My invention relates to cinematography and more particularly to an automatic safety cutoff for cinematographic projecting machines.

The object of the invention is to improve the structure as well as the means and mode of operation of such devices, whereby they will not only be cheapened in construction, but will be more efficient in operation, positive in action, automatically operated, and unlikely to get out of repair.

A further object of the invention is to provide means for automatically intercepting the concentrated light rays intermediate the condensing lenses and the film in the event that for any reason the feeding of the film is arrested.

A further object of the invention is to provide automatic means controlled by the supply portion or top loop of the film or that portion upon the initial side of the feeding sprocket, whereby a more prompt response of the safety apparatus will be effected.

With the above primary and other incidental objects in view as will more fully appear in the specification, the invention consists of the features of construction, the parts and combinations thereof, and the mode of operation, or their equivalents, as hereinafter described and set forth in the claims.

Referring to the drawings, Fig. 1 is a side elevation of a portion of a moving picture projecting apparatus to which the invention forming the subject matter hereof has been applied. Fig. 2 is a detail view somewhat diagrammatic, with the component elements of the safety apparatus forming the subject matter hereof shown in perspective.

Like parts are indicated by similar characters of reference throughout the several views.

The commercial cinematographic film in common use at the present time is in most instances composed of highly inflammable material and in all instances is subject to rapid deterioration, if not combustion, under the influence of heat. The concentration of the rays of light from the projecting lamp, usually an arc light, by means of condensing lenses, is such that in the event that the film is arrested or its feeding movement unduly retarded, grave danger of ignition arises. It is not unusual for a film to be accidentally torn or broken or to have its feeding perforations stripped or for the machine to become clogged or choked, whereby the feeding movement of the film becomes disarranged or retared. In any such event the safety cut off apparatus forming the subject matter hereof is designed to instantly operate to project a shutter or cutoff element into the rays of light emitted through the condensing lenses thereby protecting the film.

While other devices for a similar purpose have heretofore been devised and employed, such cutoff means has usually been actuated by the lower or take-up loop of the film. Such apparatus so controlled will not respond until the broken end of the film has passed the takeup, leaving the supply end of the film in the meantime dangling in the heated light rays and in danger of ignition. Likewise such apparatus dependent upon the release of the takeup loop, will not respond promptly in the event that the feeding movement of the film is temporarily arrested by the failure of the intermittent feed sprocket to perform its function. To overcome these difficulties, the present apparatus has been placed directly under control of the supply portion of the film.

Referring to the drawing, 1 is a portion of the lamp house in which the arc light or other illuminator is enclosed. Projecting from the front of the lamp house 1 is the condenser lens case or barrel 2 and in line therewith the light hood or sleeve 3.

The film feeding portion of the apparatus comprises the main frame 4 upon which is superposed the reel box 5 to contain the supply reel of film. Projecting forwardly from the main frame 4 and in axial alinement with the condenser lenses within the casing or barrel 2 and in alinement with the hood or sleeve 3 is the projecting lens barrel or tube 6. The flexible cinematograph film 7 is fed from the reel within the box 5 through the bottom thereof and between guide rolls 8 and thence under the upper roll 9 and over the constantly operating upper sprocket 10. The film 7 passing from the constantly rotating upper sprocket 10 passes beneath a guide roller 11 and forms a feeding or supply loop 12 of surplus film. This supplemental or supply loop 12 varies within prescribed limits according to the relative feeding operations of the constantly actuated upper feed sprocket 10 and the main intermittent feed sprocket which is not shown in the drawing but which is the main actuating and control element for the film. The film passes from the supply or upper loop 12 downward through guides over the said intermittent sprocket and then forms a takeup loop in the bottom of the main frame, passing thence over suitable takeup rollers 13 and 14 and over a takeup sprocket 15 to a receiving reel, not shown in the drawings. By this means, the film 7 is fed without tension or pulling strain intermittently past the framing orifice and the automatic shutter by means of the intermittent feed sprocket. The supply loop 12 relieves the film of strain, while the takeup loop likewise relieves it below. There is provided at the present time an upper film shield 16 of a substantially arcuate channeled form which receives the supply loop 12 and in the event of its undue enlargement prevents it from dropping into the line of the light.

It will be readily understood that in the event that the film 7 is broken within its vertical guides or adjacent to the intermittent feed sprocket the lower portion of the film will advance out of the machine, while the broken or torn upper end will remain stationary, while the upper sprocket 10 continues to rotate and feed film from the reel box 5. The continued feeding action of the upper sprocket 10 will thus serve to materially increase the supply loop 12 beyond its normal extent. The same thing will occur in the event that the feeding perforations are stripped from the film. In such event, the intermittent feed sprocket will fail to operatively engage the film which will not be advanced or if advanced at all, will move at an ununiform or greatly retarded rate. This lack of uniformity of feed between the intermittent feed sprocket and the upper sprocket 10 will likewise cause an abnormal distension of the upper or supply loop 12.

As thus far described the mechanism is that of an apparatus known to the trade as the Powers cameragraph and forms no part per se of the present invention. It will be understood also that the invention hereafter described is not limited to its association with this particular machine but is equally useful in conjunction with, and applicable to machines of different manufacture.

Mounted upon the hood 3 is an electromagnet 18 the armature 19 of which is pivoted at 20 and is provided with an outward projecting lip or ledge 21. Also pivotally mounted upon the hood 3 is a gravity actuated shutter 22 pivoted at 23 to a suitable bracket 24. The shutter 22 has a rearward extending tail portion 25 which engages beneath the lip or ledge 21 of the armature 19. The armature 19 thus serves as a detent to hold the pivoted shutter 22 in its elevated or inoperative position. Immediately upon the energization of the electromagnet 18 and its consequent attraction of its armature 19, the tail portion 25 of the shutter 22 is released and the shutter is permitted to fall to the position indicated by dotted lines, Fig. 1, where it intercepts the light stream and protects the film 7 from ignition. To control the electromagnet 18 there is provided a swinging contact member 26 pivoted at 27. This contact member 26 is preferably, though not necessarily, provided with an extension 28 projecting beyond its pivotal point 27, which engages the supporting block 29 to limit the oscillatory movement of the contact member 26 in one direction. The supporting block 29 is preferably of insulating material such as fiber, rubber or other non-conductive substance. The swinging contact 26 is of metal preferably aluminum in order that it may yield readily to the slightest touch of the supply loop 12 of the film. Projecting rearward from the swinging contact member 26 is a contact finger 30 adapted upon the swinging movement of the member 26 to electrically engage a spring contact 31, thereby closing an electric circuit through the magnet 18. As a convenient and economical method of forming the contact finger 30 it has been shown in Fig. 2 as a tongue punched from the swinging member 26. One side of the electro-magnet 18 is connected with the spring contact finger 31, while the other side of the magnet is connected through a battery or other source of electrical energy 32 with the supporting bracket 33 to which the swinging member 26 is pivoted. Whenever the intermittent feeding of the film 7 is interrupted either by the breakage or tearing of the film or by the stripping of the feeding perforations, or in the event that the apparatus becomes choked or clogged the continued feeding of the upper sprocket 10 will increase the relative size of the supply loop 12 of film, causing the loop to extend to such degree that it engages the swinging contact member 26 and oscillates same about its swinging connection 27. The oscillation of the member 26 under the influence of the extending loop 12 causes the contact between the finger 30 and the spring finger 31, thereby energizing the electromagnet 18 and effecting the release of the shutter 22.

By controlling the apparatus from the upper or supply loop 12 the operation of the shutter 22 is effected immediately, whereas if controlled from the takeup loop, approximately eight inches of film must be fed after a break occurs before the takeup loop is released and in the event of strippage of the feeding perforations of the film the apparatus might not be operated at all if controlled from the lower or takeup loop.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statutes, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. A cinematographic projecting machine, embodying a light box, an illuminating element therein, an interrupting element for the illuminating rays mounted on the light box, and film feeding means spaced away from the light box and interrupting element, adapted to maintain a surplus bight of film at the supply side of the projecting position, characterized by a free swinging gravity-controlled pendulum like element suspended beyond the normal limits of said bight of surplus film and adapted to be oscillated by the abnormal distention of the bight to effect the operation of said interrupting element.

2. A cinematographic projecting machine embodying a light housing having an extended hood, film feeding means spaced away from the hood, and adapted to maintain a bight of surplus film at the supply side of the projecting position, and tripping means comprising a suspended member offering minimum resistance to movement under the influence of abnormal distention of the bight, characterized by a gravity operated closure member for the light housing mounted upon the extended hood thereof and oscillating to and from operative position in a plane parallel with the rays of light from said housing, means for normally maintaining said closure member in inoperative position and for releasing said member upon operation of said tripping means by the distention of said bight.

3. The combination with a cinematographic projecting machine, including means for maintaining a bight of surplus film at the supply side of the projecting position and an illuminating element, of an interrupter for the illuminating rays, an electrically operated detent for the interrupter, and electric circuit controlling said detent, a free swinging pendant member positioned beyond the normal extent of said bight of film adapted by its swinging movement to close said electrical circuit to effect the operation of the interrupter, said member being actuated by an abnormal variation of the surplus bight of the film.

4. The combination with a cinematographic projecting machine, including means for maintaining a bight of surplus film at the supply side of the projecting position and an illuminating element, of an interrupter for the illuminating rays positioned at a distance from the film feeding mechanism of the machine, a pendant pivoted contact member positioned beyond the normal extent of said bight of film in juxtaposition to the film feeding means and distantly spaced from the interrupter, an electric circuit opened and closed by the movement of said member, and an electrically operated control member for the interrupter in said circuit, said contact member being actuated by an abnormal variation of the supply film bight.

5. The combination with a cinematographic projecting machine including a light housing and film feeding means spaced away from the light housing, of a closure member for the light housing comprising a swinging gravity operated shutter plate, an electromagnet, a movable armature therefor, means carried by the armature normally maintaining the shutter plate extended in a horizontal plane above the level of the light beam from the housing, said retaining means being withdrawn by the operation of the armature under the influence of the magnet to release the closure, an electric circuit controlling the magnet, a circuit closer positioned in proximity to the film feeding means, including a pendulum like member moving freely upon engagement therewith of an abnormally enlarged bight of film to close the electric circuit, thereby effecting the attraction of the armature by the magnet and consequently release of the housing closure.

6. In a device of the character described, the combination with a moving picture projecting machine including a lamp housing and film feeding mechanism adapted to maintain a supply bight of film at the supply side of the projecting position, of a gravity operated interrupter comprising a shutter plate pivoted upon an axis parallel with its plane, said plate being normally supported with its plane horizontally disposed above the projecting beam of light intermediate the lamp housing and the feeding film, a latch member normally holding the shutter plate in its extended flat horizontal position, a free swinging gravity controlled member extending into the path of any abnormal enlargement of the supply bight of film possessing minimum resistance to oscillation, adapted to be oscillated by contact of the expanded film bight therewith, and means for disengaging the latch to release the shutter plate by the movement of said swinging member.

In testimony whereof, I have hereunto set my hand this 11th day of July A. D. 1917.

JOSEPH J. GSCHWENDER.

Witnesses:
JOHN DINEEN,
MARVEL HOAGLAND.